United States Patent [19]

Kawaguchi et al.

[11] Patent Number: 5,250,583
[45] Date of Patent: Oct. 5, 1993

[54] OCULAR LENS MATERIAL

[75] Inventors: Toru Kawaguchi, Gifu; Ichiro Ando, Aichi; Nobuyuki Toyoshima, Nagoya; Yasushi Yamamoto, Takasaki; Hiroshi Yoshioka, Tokyo; Toshio Yamazaki, Annaka, all of Japan

[73] Assignees: Menicon Co., Ltd., Nagoya; Shin-Etsu Chemical Co., Ltd., Tokyo, both of Japan

[21] Appl. No.: 895,836

[22] Filed: Jun. 9, 1992

[30] Foreign Application Priority Data

Jul. 23, 1991 [JP] Japan .................. 3-182267

[51] Int. Cl.⁵ .................. C08F 12/20; C08F 230/08
[52] U.S. Cl. .................. 523/107; 523/106; 523/108; 526/242; 526/279; 526/323; 351/160 H
[58] Field of Search .................. 523/107, 108, 106; 526/242, 279, 323; 351/160 H

[56] References Cited

U.S. PATENT DOCUMENTS

| | | | |
|---|---|---|---|
| 4,540,761 | 9/1985 | Kawamura et al. | 526/279 |
| 4,868,260 | 9/1989 | Kawaguchi | 526/242 |
| 5,023,305 | 6/1991 | Onozuka et al. | 526/279 |

FOREIGN PATENT DOCUMENTS

| | | |
|---|---|---|
| 219884 | 4/1987 | European Pat. Off. |
| 294515 | 12/1988 | European Pat. Off. |
| 425436 | 5/1991 | European Pat. Off. |
| 2-99913 | 4/1990 | Japan |

*Primary Examiner*—Paul R. Michl
*Assistant Examiner*—Andrew E. C. Merriam
*Attorney, Agent, or Firm*—Armstrong, Westerman, Hattori, McLeland & Naughton

[57] ABSTRACT

An ocular lens material comprising a copolymer prepared by polymerizing a monomer mixture comprising, as main components, (A) 15 to 40% by mole of a fluoroalkyl (silicon-containing alkyl) fumarate, (B) 35 to 55% by mole of an N-vinyl lactam, (C) 3 to 30% by mole of at least one of acrylic acid and methacrylic acid, and (D) 0.1 to 20% by mole of a crosslinkable monomer. The ocular lens material is excellent in all of transparency, oxygen permeability, mechanical strength and hardness. Further, the material is excellent in hydrophilic property in spite of its low water absorption.

5 Claims, No Drawings

OCULAR LENS MATERIAL

BACKGROUND OF THE INVENTION

The present invention relates to an ocular lens material, and more particularly to an ocular lens material which is high in oxygen permeability and excellent in rigidity and hydrophilic property, and which is suitable for use as contact lenses, intraocular lenses, and the like.

In the field of contact lenses, studies concerning a high oxygen-permeable material have progressed in recent years. For instance, there have been developed contact lenses made of a copolymer comprising, as main components, a siloxanylalkyl methacrylate and methyl methacrylate, contact lenses made of a copolymer comprising, as main components, a siloxanylalkyl methacrylate and a fluoroalkyl methacrylate, and the like.

However, the contact lenses made of these copolymers should be necessarily decreased in the amount of the siloxanylalkyl methacrylate from the viewpoint of hardness and rigidity. Accordingly, it is difficult to obtain contact lenses having high oxygen permeability and excellent mechanical strength.

Also, the contact lenses made of the above-mentioned copolymers are high in water repellency. Accordingly, when a hydrophilic monomer such as methacrylic acid, 2-hydroxyethyl methacrylate or N-vinylpyrrolidone is used in a large amount for giving hydrophilic property, the water absorbancy of an obtained contact lens material improves, but the shape stability of contact lenses made thereof is impaired.

In order to solve the above-mentioned defects, as a hard contact lens material, for instance, an alternating copolymer comprising N-vinyl lactam and fumarate or maleate has been proposed (Japanese Unexamined Patent Publication No. 99913/1991). The hard contact lens material is a copolymer containing about 50% by mole of N-vinyl lactam, and is low in water absorption and relatively excellent in hydrophilic property. However, for improving the oxygen permeability, a large amount of a silicon-containing fumarate or a silicon-containing maleate must be used as the fumarate or maleate component, thus resulting in lowering of the hardness and hydrophilic property of the material.

An object of the present invention is to provide an ocular lens material which is simultaneously excellent in all of oxygen permeability, mechanical strength and hardness, and moreover excellent in hydrophilic property in spite of its low water absorption.

This and other objects of the present invention will become apparent from the following description.

SUMMARY OF THE INVENTION

In accordance with the present invention, there is provided an ocular lens material comprising a copolymer prepared by polymerizing a monomer mixture comprising, as main components, (A) 15 to 40% by mole of a fluoroalkyl (silicon-containing alkyl) fumarate,
(B) 35 to 55% by mole of an N-vinyl lactam,
(C) 3 to 30% by mole of at least one of acrylic acid and methacrylic acid, and
(D) 0.1 to 20% by mole of a crosslinkable monomer.

DETAILED DESCRIPTION

The ocular lens material of the present invention is, as mentioned above, composed of the copolymer prepared by polymerizing the monomer mixture comprising, as the main components, (A) 15 to 40% by mole of the fluoroalkyl (silicon-containing alkyl) fumarate,
(B) 35 to 55% by mole of the N-vinyl lactam,
(C) 3 to 30% by mole of at least one of acrylic acid and methacrylic acid, and
(D) 0.1 to 20% by mole of the crosslinkable monomer.

The fluoroalkyl (silicon-containing alkyl) fumarate (A) has a fluoroalkyl group and a silicon-containing alkyl group in its molecule, so it is a component effective for improving the oxygen permeability of the copolymer. Typical examples of the fluoroalkyl (silicon-containing alkyl) fumarate (A) are, for instance, a compound represented by the formula (I):

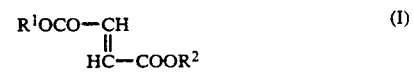

wherein $R^1$ is a group:

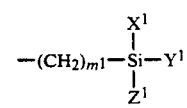

in which $X^1$, $Y^1$ and $Z^1$ are the same or different and each is $-CH_3$ or

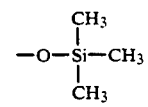

and $m^1$ is 1 or 3; and $R^2$ is a group: $-(CH_2)_k-C_aH_b\text{-}F_{2a+1-b}$ in which k is 0 or an integer of 1 to 3, a is an integer of 1 to 12 and b is 0 or 1; and the like. Concrete examples of the fluoroalkyl (silicon containing alkyl) fumarate (A) are, for instance, trifluoroethyl (trimethylsilylmethyl) fumarate, trifluoroethyl (3-(trimethylsilyl)propyl) fumarate, hexafluoroisopropyl (trimethylsilylmethyl) fumarate, hexafluoroisopropyl (3-(trimethylsilyl)propyl) fumarate, octafluoropentyl (trimethylsilylmethyl) fumarate, octafluoropentyl (3-(trimethylsilyl)propyl) fumarate, trifluoroethyl ((dimethyl(trimethylsiloxy)silyl)methyl) fumarate, trifluoroethyl (3-(dimethyl(trimethylsiloxy)silyl)propyl) fumarate, hexafluoroisopropyl ((dimethyl(trimethylsiloxy)silyl)methyl) fumarate, hexafluoroisopropyl (3-(dimethyl(trimethylsiloxy)silyl)propyl) fumarate, octafluoropentyl ((dimethyl(trimethylsiloxy)silyl)methyl) fumarate, octafluoropentyl (3-(dimethyl(trimethylsiloxy)silyl)propyl) fumarate, trifluoroethyl ((methylbis(trimethylsiloxy)silyl)methyl) fumarate, trifluoroethyl (3-(methylbis(trimethylsiloxy)silyl)propyl) fumarate, hexafluoroisopropyl ((methylbis(trimethylsiloxy)silyl)methyl) fumarate, hexafluoroisopropyl (3-(methylbis(trimethylsiloxy)silyl)propyl) fumarate, octafluoropentyl ((methylbis(trimethylsiloxy)silyl)methyl) fumarate, octafluoropentyl (3-(methylbis(trimethylsiloxy)silyl)propyl) fumarate, trifluoroethyl ((tris(trimethylsiloxy)silyl)methyl) fumarate, trifluoroethyl (3-(tris(trimethylsiloxy)silyl)propyl) fumarate, hexafluoroisopropyl ((tris(trimethylsiloxy)silyl)methyl) fumarate, hexafluoroisopropyl (3-(tris(trimethylsiloxy)silyl)propyl) fumarate, octafluoropentyl ((tris(trimethylsiloxy)silyl)- methyl) fumarate, octafluoropentyl (3-(tris(trimethylsiloxy)silyl)propyl) fumarate, tridecafluoroheptyl (trimethylsilylmethyl) fumarate, tridecafluoroheptyl (3-(trimethylsilyl)propyl) fumarate, pentadecafluorononyl (trimethylsilylmethyl) fumarate, pentadecafluorononyl (3-(trimethylsilyl)propyl) fumarate, heneicosafluorododecyl (trimethylsilylmethyl) fumarate, heneicosafluorododecyl (3-(trimethylsilyl)propyl) fumarate, tridecafluoroheptyl ((dimethyl(trimethylsiloxy)silyl)methyl) fumarate, tridecafluoroheptyl (3-(dimethyl(trimethylsiloxy)silyl)propyl) fumarate, pentadecafluorononyl ((dimethyl(trimethylsiloxy)silyl)methyl) fumarate, pentadecafluorononyl (3-(dimethyl(trimethylsiloxy)silyl)propyl) fumarate, heneicosafluorododecyl ((dimethyl(trimethylsiloxy)silyl)methyl) fumarate, heneicosafluorododecyl (3-(dimethyl(trimethylsiloxy)silyl)propyl) fumarate, tridecafluoroheptyl ((methylbis(trimethylsiloxy)silyl)methyl) fumarate, tridecafluoroheptyl (3-(methylbis(trimethylsiloxy)silyl)propyl) fumarate, pentadecafluorononyl ((methylbis(trimethylsiloxy)silyl)methyl) fumarate, pentadecafluorononyl (3-(methylbis(trimethylsiloxy)silyl)propyl) fumarate, heneicosafluorododecyl ((methylbis(trimethylsiloxy)silyl)methyl) fumarate, heneicosafluorododecyl (3-(methylbis(trimethylsiloxy)silyl)propyl) fumarate, tridecafluoroheptyl ((tris(trimethylsiloxy)silyl)methyl) fumarate, tridecafluoroheptyl (3-(tris(trimethylsiloxy)silyl)propyl) fumarate, pentadecafluorononyl ((tris(trimethylsiloxy)silyl)methyl) fumarate, pentadecafluorononyl (3-(tris(trimethylsiloxy)silyl)propyl) fumarate, heneicosafluorododecyl ((tris(trimethylsiloxy)silyl)methyl) fumarate, heneicosafluorododecyl (3-(tris(trimethylsiloxy)silyl)propyl) fumarate, and the like.

The fluoroalkyl (silicon-containing alkyl) fumarate (A) is poor in homopolymerizability, however, the fumarate (A) is easily copolymerized with the N-vinyl lactam (B). For this reason, the N-vinyl lactam (B) is used for copolymerizing with the fumarate (A). Examples of the N-vinyl lactam (B) are, for instance, N-vinyl-2-pyrrolidone, N-vinyl-3-methylpyrrolidone, N-vinyl-5-methylpyrrolidone, N-vinyl-3,3,5-trimethylpyrrolidone, N-vinyl-5-phenylpyrrolidone, N-vinyl-3-benzylpyrrolidone, N-vinyl piperidone, N-vinyl caprolactam, N-vinyl capryllactam, and the like. The N-vinyl lactams may be used alone or in an admixture thereof. Among the N-vinyl lactams, N-vinyl-2-pyrrolidone is particularly preferable because it is a typical, widely used monomer and can be easily obtained.

As mentioned above, since the fluoroalkyl (silicon-containing alkyl) fumarate (A) is poor in homopolymerizability, the N-vinyl lactam (B) is used for copolymerizing the fumarate (A). Accordingly, it is necessary that the amount of the N-vinyl lactam (B) is larger than that of the fumarate (A). On the other hand, when the amount of the used N-vinyl lactam (B) is too large, the resulting ocular lens material is high in water absorption, so there is a tendency that the lenses made thereof become poor in shape stability.

It is desired that the amount of the fluoroalkyl (silicon-containing alkyl) fumarate (A) is from 15 to 40% by mole of the total monomers to be polymerized, preferably from 20 to 35% by mole of the total monomers. When the amount of the fluoroalkyl (silicon-containing alkyl) fumarate (A) is less than 15% by mole, the resulting ocular lens material becomes low in oxygen permeability. On the other hand, when the amount of the fumarate (A) is more than 40% by mole, the hardness of the obtained ocular lens material is remarkably lowered.

The amount of the N-vinyl lactam (B) is from 35 to 55% by mole of the total monomers to be polymerized, preferably from 40 to 50% by mole of the total monomers. When the amount of the N-vinyl lactam (B) is less than 35% by mole, the hydrophilic property of the resulting ocular lens material is lowered. On the other hand, when the amount of the N-vinyl lactam (B) is more than 55% by mole, the obtained ocular lens material becomes high in water absorption, so the lenses made thereof become poor in shape stability. Also, for the reasons mentioned above, it is desired that the amount of the N-vinyl lactam (B) is larger than that of the fluoroalkyl (silicon-containing alkyl) fumarate (A).

The ocular lens material of the present invention contains at least one of acrylic acid and methacrylic acid (C) [hereinafter referred to as "(meth)acrylic acid"] in addition to the components (A) and (B). (Meth)acrylic acid (C) can improve not only hydrophilic property of the ocular lens material but also hardness of the material. It is preferable that the amount of (meth)acrylic acid (C) is from 3 to 30% by mole of the total monomer content to be polymerized, more preferably from 10 to 25% by mole of the total monomer content. When the amount of (meth)acrylic acid is less than 3% by mole, the resulting ocular lens material becomes poor in hardness. On the other hand, when the amount of (meth)acrylic acid (C) is more than 30% by mole, the obtained ocular lens material is high in water absorption and the lenses made thereof become poor in shape stability.

It is more preferable that the amount of the N-vinyl lactam (B) is equal to or more than the total amount of the fluoroalkyl (silicon-containing alkyl) fumarate (A) and (meth)acrylic acid (C) from the viewpoint of prevention of increase of water absorption.

The crosslinkable monomer (D) can improve chemical resistance as well as hardness and mechanical strength of ocular lenses, thereby stabilizing the standard or shape of, for instance, contact lenses and the like. Examples of the crosslinkable monomer (D) are, for instance, diallyl fumarate, allyl methacrylate, allyl acrylate, trimethylolpropane trimethacrylate, trimethylolpropane triacrylate, ethylene glycol dimethacrylate, ethylene glycol diacrylate, divinyl benzene, vinylbenzyl methacrylate, a crosslinkable monomer having the formula (II):

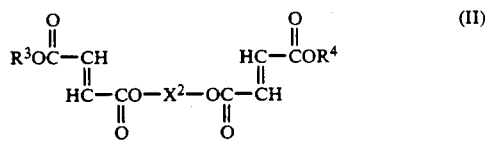

wherein $R^3$ and $R^4$ are the same or different and each is a linear, branched or cyclic alkyl group having 1 to 13 carbon atoms, a group:

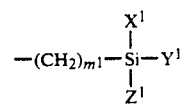

in which $X^1$, $Y^1$ and $Z^1$ are the same or different and each is $-CH_3$ or

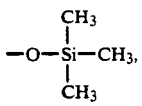

and $m^1$ is 1 or 3, or a group: $-(CH_2)_k-C_aH_bF_{2a+1-b}$ in which k is 0 or an integer of 1 to 3, a is an integer of 1 to 12 and b is 0 or 1; and $X^2$ is ethylene group or a group:

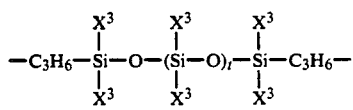

in which each $X^3$ is $-CH_3$ or

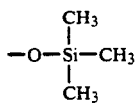

and t is 0 or an integer of 1 to 120. The crosslinkable monomer (D) may be used alone or in an admixture thereof.

It is preferable that the amount of the crosslinkable monomer (D) is from 0.1 to 20% by mole of the total monomers to be polymerized, more preferably from 5 to 15% by mole of the total monomers. When the amount of the crosslinkable monomer (D) is more than 20% by mole, an obtained ocular lens material becomes brittle. On the other hand, when the amount of the monomer (D) is less than 0.1% by mole, the obtained material is poor in chemical resistance as well as hardness and mechanical strength.

In the present invention, in order to further improve the mechanical strength and hardness of an obtained ocular lens material, at least one of a fluoroalkyl acrylate and a fluoroalkyl methacrylate [hereinafter referred to as "fluoroalkyl (meth)acrylate"] can be used in addition to the components (A), (B), (C) and (D). When only an alkyl (meth)acrylate which is a monomer generally used for improving mechanical strength and hardness is added to the monomer mixture of the components (A), (B), (C) and (D), the resulting copolymer tends to become cloudy. On the other hand, when the fluoroalkyl (meth)acrylate is added to the monomer mixture of the components (A), (B), (C) and (D), the resulting copolymer is excellent in transparency, so the fluoroalkyl (meth)acrylate is preferably used.

Examples of the fluoroalkyl (meth)acrylate are, for instance, trifluoroethyl methacrylate, trifluoroethyl acrylate, tetrafluoropropyl methacrylate, tetrafluoropropyl acrylate, pentafluoropropyl methacrylate, pentafluoropropyl acrylate, hexafluoroisopropyl methacrylate, hexafluoroisopropyl acrylate, hexafluorobutyl methacrylate, hexafluorobutyl acrylate, octafluoropentyl methacrylate, octafluoropentyl acrylate, 2,3,4,5,5,5-hexafluoro-2,4-bis(trifluoromethyl)pentyl methacrylate, 2,3,4,5,5,5-hexafluoro-2,4-bis(trifluoromethyl)pentyl acrylate, dodecafluoroheptyl methacrylate, dodecafluoroheptyl acrylate, and the like. The fluoroalkyl (meth)acrylate may be used alone or in an admixture thereof.

It is preferable that the amount of the fluoroalkyl (meth)acrylate is not more than 40% by mole of the total monomers to be polymerized, more preferably not more than 30% by mole of the total monomers. When the amount of the fluoroalkyl (meth)acrylate is more than 40% by mole, the amounts of the fluoroalkyl (silicon-containing alkyl) fumarate (A), the N-vinyl lactam (B) and (meth)acrylic acid (C) are relatively decreased, so the effects obtained by their use are insufficiently exhibited. In order to sufficiently exhibit the effect obtained by the use of the fluoroalkyl (meth)acrylate, it is preferable that the amount of the fluoroalkyl (meth)acrylate is not less than 3% by mole of the total monomers.

In the present invention, the following various monomers can be suitably admixed with the above-mentioned monomer components so that an obtained ocular lens material has desired properties.

Examples of the monomers which may be added thereto are, for instance, an alkyl acrylate or methacrylate such as methyl acrylate or methacrylate, ethyl acrylate or methacrylate, n-propyl acrylate or methacrylate, i-propyl acrylate or methacrylate, n-butyl acrylate or methacrylate, i-butyl acrylate or methacrylate, sec-butyl acrylate or methacrylate, or t-butyl acrylate or methacrylate; a silicon-containing alkyl acrylate or methacrylate such as trimethylsilylmethyl acrylate or methacrylate, 3-(trimethylsilyl)propyl acrylate or methacrylate, (dimethyl(trimethylsiloxy)silyl)methyl acrylate or methacrylate, 3-(dimethyl(trimethylsiloxy)silyl)propyl acrylate or methacrylate, (methylbis(trimethylsiloxy)silyl)methyl acrylate or methacrylate, 3-(methylbis(trimethylsiloxy)silyl)propyl acrylate or methacrylate, (tris(trimethylsiloxy)silyl)methyl acrylate or methacrylate, or 3-(tris(trimethylsiloxy)silyl)propyl acrylate or methacrylate; a styrene monomer such as styrene, p-methyl styrene, m-methyl styrene, p-t-butyl styrene, m-t-butyl styrene, p-1,1,3,3-tetramethylbutyl styrene, p-trimethylsilyl styrene, or p-tris(trimethylsiloxy)silyl styrene; a hydrophilic monomer such as 2-hydroxyethyl acrylate or methacrylate, or N,N-dimethyl acrylamide; a dialkyl fumarate such as di-i-propyl fumarate, di-t-butyl fumarate, i-propyl(t-butyl) fumarate, dicyclohexyl fumarate, or cyclohexyl(t-butyl) fumarate; a bis(silicon-containing alkyl) fumarate such as bis(3-(trimethylsilyl)propyl) fumarate, bis(3-(dimethyl(trimethylsiloxy)silyl)propyl) fumarate, bis(3-(methylbis(trimethylsiloxy)silyl)propyl) fumarate, or bis(3-(tris(trimethylsiloxy)silyl)propyl) fumarate; an alkyl (silicon-containing alkyl) fumarate such as i-propyl (3-(trimethylsilyl)propyl) fumarate, cyclohexyl (3-(trimethylsilyl)propyl) fumarate, i-propyl (3-(dimethyl(trimethylsiloxy)silyl)propyl) fumarate, cyclohexyl (3-(dimethyl(trimethylsiloxy)silyl)propyl) fumarate, i-propyl (3-(methylbis(trimethylsiloxy)silyl)propyl) fumarate, cyclohexyl (3-(methylbis(trimethylsiloxy)silyl)propyl) fumarate, i-propyl (3-(tris(trimethylsiloxy)silyl)propyl) fumarate, or cyclohexyl (3-(tris(trimethylsiloxy)silyl)propyl) fumarate, and the like. These monomers may be used alone or in an admixture thereof. In case the alkyl acrylate or methacrylate is used, it is necessary to use the fluoroalkyl (meth)acrylate for improving the transparency of an obtained ocular lens.

The amount of the other monomers as mentioned above varies depending on the desired physical properties of the ocular lens material, and cannot be generally decided. Usually, the amount of the other monomers is adjusted so that the other monomers are contained in the total monomer content of not more than 20% by mole, preferably not more than 10% by mole. When the amount of the other monomers is more than 20% by mole, the amounts of the essential components are relatively decreased, and the effects obtained by using the essential components can be insufficiently exhibited.

Any polymerization manners usually conducted in the art can be applied to the polymerization method of the copolymer according to the present invention without particular limitations. For instance, there is cited a method wherein the polymerization is conducted at room temperature to about 130° C., using a radical polymerization initiator used typically for the polymerization of a vinyl monomer. Examples of the radical polymerization initiator are, for instance, benzoyl peroxide, azobisisobutyronitrile, azobisdimethylvaleronitrile, and the like. The initiators may be used alone or in an admixture thereof. The amount of the radical polymerization initiator is from 0.01 to 1 part by weight based on 100 parts by weight of the total monomer content to be polymerized.

The ocular lens material of the present invention can be formed into desired ocular lenses in a usual manner. For instance, when obtaining contact lenses as the ocular lens, the polymerization is conducted in a mold having a shape corresponding to that of a contact lens to directly give the shape of contact lens, followed by, as occasion demands, mechanical processing finish. Also, the polymerization is conducted in a suitable mold or vessel to give a material in the state of a plate or bar, followed by a usual mechanical process such as cutting or polishing.

The present invention is more specifically described and explained by means of the following Examples wherein all percents and parts are by weight unless otherwise noted. It is to be understood that the present invention is not limited to the Examples, and various changes and modifications may be made in the invention without departing from its spirit and scope.

EXAMPLE 1

There were mixed 45 parts by mole of N-vinyl-2-pyrrolidone (NVP), 30 parts by mole of 2,2,2-trifluoro-1-trifluoromethylethyl (3-(tris(trimethylsiloxy)silyl)propyl) fumarate (F6S4F), 15 parts by mole of methacrylic acid (MAA), and 10 parts by mole of ethylene glycol dimethylacrylate (EDMA), then, as a polymerization initiator, 2,2'-azobis(2,4-dimethylvaleronitrile) (V-65) was added thereto in an amount of 0.2 part based on 100 parts of the mixture of the monomers to be polymerized, and were thoroughly stirred.

A glass test tube was charged with the monomer mixture, a space of the tube was replaced by nitrogen gas, and it was sealed. The sealed tube was allowed to stand in a water bath at 35° C. for 24 hours, then at 50° C. for 8 hours to polymerize, then was heated in a dry oven at 60° C. for 1 hour, at 70° C. for 1 hour, at 80° C. for 1 hour, at 90° C. for 1 hour, at 100° C. for 1 hour, at 110° C. for 1 hour and finally at 120° C. for 1 hour to complete the polymerization.

The obtained copolymer was subjected to cutting to give test specimens for measuring the following various physical properties. The results are shown in Table 1.

OXYGEN PERMEABILITY

Using a Yanagimoto gas permeater GTR-30R commercially available from Kabushiki Kaisha Yanagimoto Seisakusho, the oxygen permeability [cc.cm/(cm$^2$.sec.mmHg)] of a test specimen having a diameter of 12.7 mm and a thickness of 0.5 mm is measured at 35° C. according to a pressure method.

SHORE D HARDNESS

Using a Durometer GS-702 commercially available from Teclock Corporation the Shore D hardness of a test specimen having a diameter of 12.7 mm and a thickness of 4.0 mm is measured in an air-conditioned room at 25° C. under 50% RH (relative humidity).

ROCKWELL HARDNESS

Using a Rockwell Superficial hardness tester commercially available from Akashi Seisakusho LTD., a Rockwell hardness of the test specimen having a diameter of 12.7 mm and a thickness of 4.0 mm is measured in the conditions of a load of 30 kg and an indenter of $\frac{1}{4}$ inch (about 0.64 cm) in an air-conditioned room at 25° C. under 50% RH.

CONTACT ANGLE

The contact angle of a specimen having a diameter of 12.7 mm and a thickness of 4.0 mm, both sides of which are polished is measured according to a bubble method.

WATER ABSORPTION

The water absorption is calculated by the following formula.

$$(\text{Water absorption})(\%) = \frac{(\text{Weight of the test specimen dipped in water for 72 hours})(g) - (\text{Weight of the test specimen dried at 50° C. for 24 hours})(g)}{(\text{Weight of the test specimen dried at 50° C. for 24 hours})(g)} \times 100$$

APPEARANCE

A test specimen is observed with the naked eye.

EXAMPLES 2 TO 11

Copolymers were prepared in the same manner as in Example 1 except that monomers to be copolymerized were changed to those shown in Table 1, and the physical properties were measured in the same manner as in Example 1. In the polymerizations of all Examples 2 to 11, V-65 was used as a polymerization initiator in an amount of 0.2 part based on 100 parts of the monomer mixture.

Codes used in Table 1 are as follows:

F3S4F: 2,2,2-Trifluoroethyl (3-(tris(trimethylsiloxy)silyl)propyl) fumarate

F8S4F: 2,2,3,3,4,4,5,5-Octafluoropentyl (3-(tris(trimethylsiloxy)silyl)propyl) fumarate F6S3F: 2,2,2-Trifluoro-1-trifluoromethylethyl (3-(methylbis(trimethylsiloxy)silyl)propyl) fumarate 6FPMA: 2,2,2-Trifluoro-1-trifluoromethylethyl methacrylate 3FEMA: 2,2,2-Trifluoroethyl methacrylate.

TABLE 1

| Ex. No. | 1 | 2 | 3 | 4 | 5 | 6 | 7 | 8 | 9 | 10 | 11 |
|---|---|---|---|---|---|---|---|---|---|---|---|
| Monomer mixture | | | | | | | | | | | |
| Fluoroalkyl (silicon-containing alkyl) fumarate (part by mole) | F6S4F (30) | F6S4F (25) | F6S4F (30) | F6S4F (27) | F6S4F (29) | F6S4F (20) | F6S4F (35) | F6S4F (30) | F6S4F (20) | F6S4F (20) | F6S4F (20) |
| | | | | | | | | | F3S4F (10) | F6S3F (10) | F8S4F (10) |
| N-vinyl lactam (part by mole) | NVP (45) | NVP (40) | NVP (40) | NVP (42) | NVP (44) | NVP (45) | NVP (45) | NVP (48) | NVP (45) | NVP (45) | NVP (45) |
| (Meth)acrylic acid (part by mole) | MAA (15) | MAA (15) | MAA (10) | MAA (15) | MAA (15) | MAA (25) | MAA (10) | MAA (18) | MAA (15) | MAA (15) | MAA (15) |
| Fluoroalkyl (meth)acrylate (part by mole) | — | 6FPMA (12) | 6FPMA (12) | 3FEMA (8) | 3FEMA (4) | — | — | — | — | — | — |
| Crosslinkable monomer (part by mole) | EDMA (10) | EDMA (8) | EDMA (8) | EDMA (8) | EDMA (8) | EDMA (10) | EDMA (10) | EDMA (4) | EDMA (10) | EDMA (10) | EDMA (10) |
| Oxygen permeability ($\times 10^{-11}$) | 131 | 121 | 147 | 117 | 125 | 73 | 149 | 136 | 118 | 122 | 128 |
| Shore D hardness (−) | 78 | 79 | 76 | 79 | 77 | 82 | 75 | 76 | 79 | 79 | 78 |
| Rockwell hardness (−) | 37 | 47 | 27 | 39 | 34 | 61 | 18 | 23 | 42 | 39 | 33 |
| Contact angle (degree) | 46 | 44 | 55 | 55 | 50 | 45 | 56 | 48 | 45 | 44 | 47 |
| Water absorption (%) | 1.8 | 1.4 | 0.9 | 1.5 | 1.6 | 2.3 | 1.2 | 2.0 | 1.9 | 1.9 | 1.7 |
| Appearance | ○ | ○ | ○ | ○ | ○ | ○ | ○ | ○ | ○ | ○ | ○ |

(Note) ○: Transparent

COMPARATIVE EXAMPLE 1

A copolymer was prepared in the same manner as in Example 1 except that 30 parts by mole of 2,2,2-trifluoro-1-trifluoromethylethyl [hereinafter referred to as "hexafluoroisopropyl"] methacrylate and 30 parts by mole of 3-(tris(trimethylsiloxy)silyl)propyl methacrylate were used instead of 30 parts by mole of F6S4F, so that the number of the substituents, hexafluoroisopropyl groups in F6S4F used in Example 1 was equalized to the number of the groups in hexafluoroisopropyl methacrylate used in Comparative Example 1, and the number of the substituents, 3-(tris(trimethylsiloxy)silyl)propyl groups in F6S4F was equalized to the number of the groups in 3-(tris(trimethylsiloxy)silyl)propyl methacrylate.

The obtained copolymer had an oxygen permeability of $75 \times 10^{-11}$ [cc.cm/(cm$^2$.sec.mmHg)], which was remarkably lower than the oxygen permeability of the copolymer obtained in Example 1.

From the results obtained in Example 1 and Comparative Example 1, it would be considered that to the copolymer obtained in Example 1, which is prepared by using F6S4F which has both hexafluoroisopropyl group and 3-(tris(trimethylsiloxy)silyl)propyl group in its molecule, high oxygen permeability is given due to its specific polymer structure comprising portions wherein one hexafluoroisopropyl group and a 3-(tris(trimethylsiloxy)silyl)propyl group are neighbouring each other.

COMPARATIVE EXAMPLE 2

A copolymer was prepared in the same manner as in Example 1 except that NVP was not used. The obtained copolymer was cloudy, and non-reacted F6S4F remained, which was unsuitable for use as ocular lens materials.

From the results obtained above, it would be recognized that in the present invention it is necessary to use the N-vinyl lactam.

COMPARATIVE EXAMPLE 3

A copolymer was prepared in the same manner as in Example 1 except that MAA was not used. The obtained copolymer had a Shore D hardness of 73, which was lower than the Shore D hardness of the copolymer obtained in Example 1.

COMPARATIVE EXAMPLE 4

A copolymer was prepared in the same manner as in Example 1 except that 15 parts by mole of di-t-butyl fumarate was used instead of 15 parts by mole of MAA. The obtained copolymer had a Shore D hardness of 75 which was lower than the Shore D hardness of the copolymer obtained in Example 1, and a contact angle of 70°, so was poor in hydrophilic property.

COMPARATIVE EXAMPLE 5

A copolymer was prepared in the same manner as in Example 1 except that 30 parts by mole of bis(hexafluoroisopropyl) fumarate was used instead of 30 parts by mole of F6S4F. The obtained copolymer had an oxygen permeability of $43 \times 10^{-11}$ [cc.cm/(cm$^2$.sec.mmHg)], which was very low.

COMPARATIVE EXAMPLE 6

A copolymer was prepared in the same manner as in Example 1 except that 30 parts by mole of bis(3-(tris(trimethylsiloxy)silyl)propyl) fumarate was used instead of 30 parts by mole of F6S4F. The obtained copolymer was cloudy, and had a Shore D hardness of 65 which was very low. Therefore, the copolymer was unsuitable for use as ocular lens materials.

COMPARATIVE EXAMPLE 7

A copolymer was prepared in the same manner as in Example 1 except that 15 parts by mole of bis(hexafluoroisopropyl) fumarate and 15 parts by mole of bis(3-(tris(trimethylsiloxy)silyl)propyl) fumarate were used instead of 30 parts by mole of F6S4F, so that the number of the substituents in F6S4F used in Example 1 was equalized to the number of the groups in both bis(hexafluoroisopropyl)fumarate and bis(3-(tris(trimethylsiloxy)silyl)propyl) fumarate. The obtained copolymer was cloudy, which was unsuitable for use as ocular lens materials.

From the results obtained as above, the utility of F6S4F having hexafluoroisopropyl group and 3-(tris(trimethylsiloxy)silyl)propyl group would be recognized.

The ocular lens material of the present invention is excellent in transparency, and is excellent in all of oxygen permeability, mechanical properties and hardness. Also, the material is excellent in hydrophilic property in spite of its low water absorption. Accordingly, the lens material is suitable for use as ocular lenses containing contact lenses, intraocular lenses, and the like.

In addition to the ingredients used in the Examples, other ingredients can be used in the Examples as set forth in the specification to obtain substantially the same results.

What we claim is:

1. An ocular lens material comprising a copolymer prepared by polymerizing a monomer mixture comprising, as main components, (A) 15 to 40% by mole of a fluoroalkyl (silicon-containing alkyl) fumarate, (B) 35 to 55% by mole of an N-vinyl lactam, (C) 3 to 30% by mole of at least one of acrylic acid and methacrylic acid, and (D) 0.1 to 20% by mole of a crosslinkable monomer.

2. The material of claim 1, wherein said monomer mixture further contains at least one of a fluoroalkyl acrylate and a fluoroalkyl methacrylate in an amount of not more than 40% by mole.

3. The material of claim 1, wherein said fluoroalkyl (silicon-containing alkyl) fumarate is a compound represented by the formula (I):

$$R^1OCO-CH \atop \| \atop HC-COOR^2 \qquad (I)$$

wherein $R^1$ is a group:

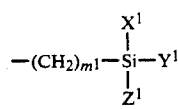

in which $X^1$, $Y^1$ and $Z^1$ are the same or different and each is —$CH_3$ or

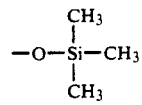

and $m^1$ is 1 or 3; and $R^2$ is a group: —$(CH_2)_k$—$C_aH_bF_{2a+1-b}$ in which k is 0 or integrer of 1 to 3, a is an integer of 1 to 12 and b is 0 or 1.

4. The material of claim 1, wherein said N-vinyl lactam is N-vinyl-2-pyrrolidone.

5. The material of claim 1, wherein said crosslinkable monomer is at least one monomer selected from the group consisting of diallyl fumarate, allyl methacrylate, allyl acrylate, trimethylolpropane trimethacrylate, trimethylolpropane triacrylate, ethylene glycol dimethacrylate, ethylene glycol diacrylate, divinyl benzene, vinylbenzyl methacrylate, a crosslinkable monomer having the formula (II):

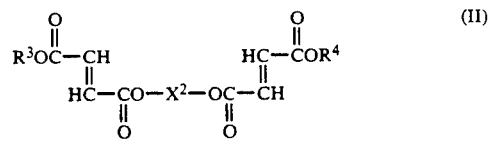

wherein $R^3$ and $R^4$ are the same or different and each is a linear, branched or cyclic alkyl group having 1 to 13 carbon atoms, a group:

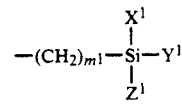

in which $X^1$, $Y^1$ and $Z^1$ are the same or different and each is —$CH_3$ or

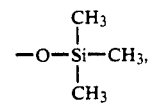

and $m^1$ is 1 or 3, or a group: —$(CH_2)_k$—$C_aH_bF_{2a+1-b}$ in which k is 0 or an integer of 1 to 3, a is an integer of 1 to 12 and b is 0 or 1; and $X^2$ is ethylene group or a group:

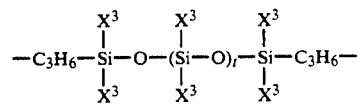

in which each $X^3$ is —$CH_3$ or

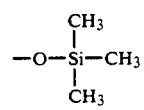

and t is 0 or an integer of 1 to 120.

* * * * *